United States Patent [19]

Paolinelli et al.

[11] 4,098,869
[45] Jul. 4, 1978

[54] PROCESS FOR THE HYDROLYSIS OF TITANYL SULPHATE SOLUTIONS

[75] Inventors: Antonio Paolinelli, Milan; Tullio Pellizzon, Paderno Dugnano (Milan); Luigi Piccolo, Milan, all of Italy

[73] Assignee: Euteco S.p.A., Milan, Italy

[21] Appl. No.: 839,471

[22] Filed: Oct. 4, 1977

[30] Foreign Application Priority Data

Oct. 5, 1976 [IT] Italy .................. 27991 A/76

[51] Int. Cl.² ................................. C01G 23/06
[52] U.S. Cl. .............................. 423/85; 423/616
[58] Field of Search ................ 423/85, 615, 616

[56] References Cited

U.S. PATENT DOCUMENTS

| | | | |
|---|---|---|---|
| 1,795,467 | 3/1931 | Blumenfeld | 423/616 |
| 2,319,824 | 5/1943 | Olson | 423/615 |
| 2,331,496 | 10/1943 | Olson | 423/616 |
| 2,344,265 | 3/1944 | Plechner et al. | 423/615 |
| 2,346,091 | 4/1944 | Stark et al. | 423/616 |
| 4,014,977 | 3/1977 | Piccolo et al. | 423/616 |

FOREIGN PATENT DOCUMENTS

| | | | |
|---|---|---|---|
| 275,672 | 1/1929 | United Kingdom | 423/615 |
| 934,626 | 8/1963 | United Kingdom | 423/615 |

*Primary Examiner*—Earl C. Thomas
*Assistant Examiner*—Brian E. Hearn
*Attorney, Agent, or Firm*—Sughrue, Rothwell, Mion, Zinn and Macpeak

[57] ABSTRACT

Hydrolysis of a titanyl sulphate solution is carried out according to the autonucleation method of gradually adding the solution to a body of water at a substantially constant rate over 10–20 minutes, in such a way as to obtain an ionic concentration after one minute of feeding of from 75 to 105 g/l, the concentration of sulphuric acid in the final hydrolysis solution being regulated to a value of from 310 to 330 g/l by adding water from the commencement of clouding of the hydrolysis solution up to the end of hydrolysis.

6 Claims, No Drawings

PROCESS FOR THE HYDROLYSIS OF TITANYL SULPHATE SOLUTIONS

The present invention relates to the preparation of titanium dioxide and more particularly to the preparation of titanium dioxide by hydrolysis of solutions of titanium salts produced by the so-called sulphate process.

Still more particularly the present invention relates to improvements in the precipitation of titanium hydroxide according to the autonucleation hydrolysis process, to obtain a product of improved physical properties and pigmentary characteristics.

As is known, in the manufacture of titanium dioxide by the sulphate process, a titaniferous material, such as ilmenite or a titaniferous slag, is brought into contact at sufficiently high temperatures with concentrated sulphuric acid so as to produce a solid porous mass consisting of ferrous and ferric sulphates, titanyl sulphate, small amounts of unreacted material, prevailingly consisting of silica and alumina, and also, although to lesser extent, of sulphates of magnesium, chromium, manganese, vanadium and other elements.

The solid porous mass is then dissolved in water, or water acidified with sulphuric acid, and the ferric sulphate present in the resulting solution of sulphates is transformed into ferrous sulphate by addition to the solution of a reducing agent, normally iron in the form of a powder, filings or scrap.

The resulting solution is clarified by means of treatment with flocculants and subsequent filtration so as to remove the undissolved, suspended impurities.

The ferrous sulphate present is then separated to a large extent by means of precipitation in its heptahydrate form ($FeSO_4.7H_2O$) by cooling the solution and subsequent filtration or centrifuging.

The residual solution, after concentration, consists of the "ilmenite solution" ready for separation of the titanium by precipitation of its hydroxide. One of the best known and most used methods of precipitation of titanium hydroxide from ilmenite solutions consists of autonucleation hydrolysis, in which the soluble titanyl sulphate is transformed into the insoluble titanium hydroxide.

According to that method the hydrolysis of the titanyl sulphate is initiated in an aqueous solution with a low concentration of titanyl sulphate, which is maintained in near boiling conditions, and is then continued, while gradually adding the ilmenite solution to the said aqueous solution so as gradually to increase the titanyl sulphate concentration, said addition being carried out under agitation for a prolonged period of time at a substantially constant rate. During the addition, the temperature of the liquid under hydrolysis is maintained near boiling point and heating is continued even after the addition is completed.

In practice an ilmenite solution with a $TiO_2$ concentration of the order of 230–260 grams per liter and a content of sulphuric acid, free and combined with $TiO_2$, of the order of about 500–600 grams per liter, is first prepared. The solution is gradually added at a temperature of from 95° to 105° C to water, maintained at a temperature of from 90° to 95° C and in an amount equal to approximately a quarter of the volume of the ilemnite solution itself, at a constant rate over a period of time greater than 10 minutes and under homogeneous agitation.

The resulting mass is then brought to boiling point and is maintained at this temperature until the separation of the precipitate is complete.

This procedure is described in detail in Example 1 of U.S. Pat. No. 2,344,265.

After precipitation of the hydroxide the latter is separated, appropriately admixed with additives and subjected to calcination to give the titanium dioxide from which the finished product is obtained by grinding and possible post-treatment.

The technique of autonucleation hydrolysis illustrated above has some non-negligible disadvantages. In particular it has the disadvantage of giving rise to pigments with characteristics that are difficult to reproduce. This derives from the fact that, by using the autonucleation technique, the grain size of the precipitated products depends above all on the "acid factor" of the ilmenite solutions, where by "acid factor" is understood the ratio between the free sulphuric acid and the sulphuric acid combined with the titanium in solution, considered as titanyl sulphate.

With an acid factor in the ilmenite solutions equal to 0.50 a pigment is obtained with an average diameter of the particles equal to 0.2 microns, which corresponds to the optimum value for the pigmentary characteristics. With an acid factor equal to 0.70 the average diameter of the particles reaches values around 0.25 microns; with an acid factor of between 0.80 to 0.90 the average diameter reaches values of about 0.30 microns, thence departing ever further from the optimum value.

It is clear that, as defined above, the acid factor depends above all on the weight ratio between the ilmenite mineral and the sulphuric acid used to attack said ilmenite and on the chemical composition of the ilmenite mineral.

However, for the same weight ratio of the sulphuric acid to the ilmenite mineral and for the same chemical composition of the ilmenite mineral, the acid factor also depends on the progress of the attack by sulphuric acid: a low acid factor corresponds to a high reaction yield, whilst a high acid factor corresponds to a low reaction yield.

In practice the reaction yield is not constant and thus the acid factor is not reproducible. As a result, the grain size of the precipitated products, and consequently of the final titanium dioxide, and the pigmentary characteristics of the latter vary from batch to batch.

Moreover, with ilmenite solutions having particularly high acid factors, for example of the order of 0.75 – 0.85, final products are obtained with unacceptable pigmentary characteristics.

In practice ilmenite solutions with acid factors greater than 0.65 – 0.70 may not be used to advantage in autonucleation hydrolysis and the problem arises of their utilisation, in that they cannot be disposed of because, in addition to economic loss, they would also cause serious ecological damage.

Therefore generally these solutions are stored and gradually added to ilmenite solutions resulting from other attack reactions, provided that the acid factor of the resulting mixture may be contained within acceptable limits.

This procedure is economically burdensome because of the expense connected both with the storage and with the further operative complexities still required to obtain titanium dioxide with satisfactory pigmentary characteristics.

A process has now unexpectedly been found for the preparation of titanium dioxide including the autonucleation hydrolysis of ilmenite solutions which as well as allowing the advantageous use of ilmenite solutions with acid factors greater than 0.65 up to 0.85 also enables $TiO_2$ pigments to be obtained with optimum and constant grain size and pigmentary characteristics irrespective of the acid factor of the ilmenite solutions.

Thus, the invention provides a process for the hydrolysis of a titanyl sulphate solution by heating, in which the hydrolysis is initiated by gradually adding the solution at a substantially uniform rate to an aqueous liquor, which comprises adding a titanyl sulphate solution having an acid factor of from 0.5 to 0.85, a titre, expressed as $TiO_2$, of from 230 to 260 g/l, a concentration of free sulphuric acid of from 200 to 250 g/l and a concentration of active sulphuric acid of from 500 to 600 g/l over a period of from 10 to 20 minutes, the weight ratio between aqueous liquor and titanyl sulphate solution being regulated in dependence on the acid factor of the solution in such a way as to ensure in the resulting aqueous mixture after one minute of feeding of the solution an ionic concentration of from 75 to 105 g/l and a concentration of sulfuric acid in the final hydrolysis solution of from 310 to 330 g/l, said ionic concentration after one minute of feeding being set at a value of from 92 to 102 g/l in the case of a solution with an acid factor of from 0.5 to 0.65, at a value of from 90 to 100 g/l in the case of a solution with an acid factor of from 0.65 to 0.75 and at a value of from 82 to 97 g/l in the case of a solution with an acid factor of from 0.75 to 0.85, water being added to the hydrolysis solution resulting from the addition of the titanyl sulphate solution to the aqueous liquor, from the commencement of clouding of said hydrolysis solution up to the end of hydrolysis, to regulate the concentration of sulphuric acid in the final hydrolysis solution at a value of from 310 to 330 g/l.

The expression "ionic concentration" as used herein is meant to convey the sum of the concentrations of the tetravalent titanium ions expressed as $TiO_2$, of ferrous ions and of free sulphuric acid present in the aqueous mixture.

The essential characteristic of the process of the present invention consists of the regulation of the ionic concentration in the aqueous mixture in such a way as to ensure, for the said mixture, one minute from the start of feeding the ilmenite solution into the aqueous liquor, the attaining of predetermined values which are variable according to the acid factor of the ilmenite solution under consideration.

More precisely with ilmenite solutions having acid factors of from 0.50 to 0.65 the addition of the same to the aqueous liquor is carried out in such a way as to ensure, after one minute, an "ionic concentration" of from 92 to 102 g/l, and preferably of from 95 to 98 g/l, in the resulting aqueous mixture.

On the other hand with ilmenite solutions having acid factors of from 0.65 to 0.75 the addition of the same to the aqueous liquor is carried out in such a way as to ensure, after one minute, an ionic concentration of from 90 to 100 g/l, and preferably of from 93 to 96 g/l. Finally with ilmenite solutions having acid factors of from 0.75 up to 0.85 the addition of the same to the aqueous liquor is carried out in such a way as to ensure, after one minute, an ionic concentration of from 82 to 97 g/l, and preferably of from 85 to 94 g/l.

The ilmenite solutions under consideration are those obtained according to the known art by attack of ilmenite or ilmenite slag with concentrated sulphuric acid and have a concentration of $TiO_2$ of the order of 230–260 g/l, of free sulphuric acid of the order of 200–250 g/l and of active sulphuric acid of the order of 500-600 g/l. Moreover, the ratio between ferrous iron and $TiO_2$ in the ilmenite solution is generally from about 0.25:1 to about 0.33:1, as is known per se.

By active sulphuric acid is understood the whole of the free sulphuric acid and the sulphuric acid combined with the $TiO_2$ in titanyl sulphate. The aqueous liquor is generally water, or a dilute ilmenite solution having a low concentration of titanyl sulphate.

In the preferred embodiment of the process of the present invention, a certain quantity of water (which we shall hereafter call the body of water) is first preheated generally to about 90°–95° C and then the ilmenite solution, previously heated to 94°–98° C is added to the water in such a way that the ionic concentration in the resulting aqueous mixture is within the range of values indicated above after one minute of feeding.

This may be carried out by regulating either the body of water or the feed rate of the ilmenite solution.

Preferably, the feed time of the ilmenite solution is fixed at a predetermined value, for example at the typical value of 16 minutes, and the values indicated above for the ionic concentration in the aqueous mixture are achieved by varying the body of water in dependence on the acid factor of the ilmenite solution under consideration.

When the feeding of the ilmenite solution into the aqueous mass has been completed, which is normally conducted in a time of not less than 10 minutes and preferably from 15 to 20 minutes, the resulting solution is heated to boiling point and kept under these conditions until a permanent clouding of the solution appears.

At this point it is preferable to interrupt the boiling for at least 30 minutes and in any case not more than 1 hour and then to resume boiling until the hydrolysis is complete, generally for periods of about 2–3 hours.

Moreover according to the process of the present invention, when the clouding appears, and preferably after the boiling is resumed, water is added continuously or intermittently to the hydrolysis solution in such a way that the sulphuric acid content at the end of the hydrolysis is from 310 to 330 g/liter, and preferably from 315 to 325 g/liter. The termination of the hydrolysis is determined analytically.

The precipitate obtained is then filtered according to known methods, for example under vacuum, and the separated titanium hydroxide is washed with water or acidified aqueous solutions. The hydroxide, after the usual operations of bleaching and treatment with rutile seed crystals and mineralizing additives, is calcined at a temperature of from 850° to 950° C, and then wet ground, filtered and dried.

The $TiO_2$ pigment obtained has an average grain size of from 0.20 to 0.22 microns and pigmentary characteristics measured as the Reynolds reducing power of from 1780 to 1850, irrespective of the values of the acid factor under consideration for the starting ilmenite solutions.

The process of the present invention has the further advantage of enabling pigments to be obtained with the properties shown above while maintaining the hydrolysis yields always at optimum values, generally around 95% by weight.

Finally the concentration of the sulphuric acid obtained as a by product according to the process of the invention is within a range of values such as to enable easy recovery and re-use of the same.

The invention will now be illustrated by the following Examples which in no way seek to restrict its scope.

EXAMPLE 1 (comparative)

An ilmenite solution was prepared, as described below, according to the procedure described in the B.I.O.S. FINAL REPORT NO. 451.

To this end 8 Kg of Norwegian ilmenite, with the following chemical composition by weight: $TiO_2$ 43.6%; FeO 33.3%; $Fe_2O_3$ 13.5%; MnO 0.3%; $Cr_2O_3$ 0.01%; $V_2O_5$ 0.17%; $P_2O_5$ 0.025%; $Al_2O_3$ 1.1%; CaO 0.25%; MgO 4.67%; $SiO_2$ 3.0%; finely ground to a grain size such that 90% passes through a 325 mesh sieve, was admixed with 13.5 Kg of 94.7% $H_2SO_4$. The mixture was fed to a pilot digester fitted at the bottom with an air distributor which serves to maintain the mixture under agitation. Preheating to a temperature of 50° C was carried out and then initiation of the reaction was provoked by the introduction of 1.37 Kg of water. The temperature of the mixture was thus rapidly raised to 190° C and the reaction was completed after 4 hours. The reaction mass was then dissolved in water and the reduction of the ferric sulphate to ferrous sulphate was carried out by means of iron shavings. The solution was clarified by treatment with SEPARAN CP 35 from DOW CHEMICALS and the solid particles were separated by decantation.

The solution was cooled to 20° C in order to crystallise part of the ferrous sulphate which was separated by means of a centrifuge whilst the residual solid particles were separated by filtration after the solution had been heated to 60° C.

The solution thus obtained was concentrated by heating to 60° C under vacuum up to a concentration of 247 grams/liter of $TiO_2$ to form the ilmenite solution ready for the precipitation of the titanium hydroxide.

The chemical composition of this solution was as follows:

| | | |
|---|---|---|
| $Ti^{4+} + Ti^{3+}$ | expressed as $TiO_2$ | 247 g/l. |
| $Ti^{3+}$ | expressed as $TiO_2$ | 2.5 g/l. |
| $Fe^{2+}$ | | 75 g/l. |
| $H_2SO_4$ | free | 206.1 g/l. |
| $H_2SO_4$ | active | 509.2 g/l. |
| acid factor | | 0.68 |

The precipitation was carried out by means of hydrolysis according to the technique in Example 1 of U.S. Pat. No. 2,344,265 as described below.

A liter of ilmenite solution heated to 96° C was added with a constant rate of feed to 250 ml of water (body of water) preheated to 91° C, over a period of 16 minutes and under agitation, in a reactor fitted with a reflux condenser.

The ionic concentration in the body of water at the end of the first minute was 105.6 g/liter.

After the addition the solution was gradually heated to reach boiling point after 44 minutes.

The commencement of precipitation occurred after 2 minutes from the commencement of boiling and at this point, as suggested in U.S. Pat. No. 2,253,595 and British Pat. No. 558,285 heating and agitation were stopped. Heating and agitation were resumed after 30 minutes bringing the solution back to boiling and the solution was maintained under these conditions for 2.5 hours. During this last period of time a further 100 ml of water were added gradually. At the end of the hydrolysis operation filtration was carried out in order to separate the titanium hydroxide from the acid solution.

The hydrolysis yield was 92% and the acid solution had a content of 349.1 g/l of free $H_2SO_4$. The titanium hydroxide was then washed with an aqueous 2.5% solution of $H_2SO_4$ and then admixed with water until a suspension of 300 g/l of $TiO_2$ was obtained, treated with 86.1 grams of $H_2SO_4$ and with 1.19 grams of zinc granules and maintained at 90° C under agitation for two hours. The product obtained was then treated with rutile seed crystals, prepared according to the method described in U.S. Pat. No. 2,389,026, in an amount equal to 3% by weight with respect to the $TiO_2$.

Filtration and a further washing with water were carried out and then the titanium hydroxide was admixed with $Al_2(SO_4)_3$, $K_2SO_4$ and $ZnSO_4$ added in amounts equal to 0.1%, 0.5% and 0.1% by weight respectively in relation to the weight of $TiO_2$. Finally calcination was carried out at 870° C for 40 minutes.

The calcined product was admixed with water to form a suspension containing 1000 grams of $TiO_2$ per liter of water, and subjected to grinding in a ball mill at high speed for 40 minutes.

Filtration and drying were carried out and the product was subjected to tests for microscopic and pigmentary characterisation.

Under the electron microscope the product was shown to be formed of particles having an average diameter of 0.26 micron whilst on examination by the REYNOLDS method (as described in H. A. Gardner, G. G. Sward "Physical and Chemical Examinations Paints, Varnishes, Lacquers and Colours" 12th Edition March 1962, p.53) the reducing power was shown to be 1620. The results of Example 1 are also summarised in the Table.

EXAMPLE 2 (comparative)

Using the same technique as in Example 1 and the same type of Norwegian ilmenite an ilmenite solution is obtained with the following characteristics:

| | | |
|---|---|---|
| $Ti^{4+} + Ti^{3+}$ | expressed as $TiO_2$ | 249 g/l |
| $Ti^{3+}$ | expressed as $TiO_2$ | 2.3 g/l |
| $Fe^{2+}$ | | 74.1 g/l |
| $H_2SO_4$ | free | 247.5 g/l |
| $H_2SO_4$ | active | 553.0 g/l |
| acid factor | | 0.81 |

The solution was subjected to precipitation by hydrolysis in the identical manner to Example 1. The ionic concentration in the body of water at the end of the first minute of feeding the ilmenite solution was 114.1 g/l. The titanium hydroxide obtained was then treated as in Example 1.

A hyrolysis yield of 83% was obtained whilst the final concentration in the acid solution was 361.9 g/l of $H_2SO_4$.

The final titanium dioxide had an average diameter of 0.27 micron and a Reynolds reducing power of 1550.

The results of Example 2 are summarised in the Table.

EXAMPLE 3 (invention)

The same ilmenite solution as in Example 1 was subjected to hydrolysis according to the process of the invention.

To this end a liter of the ilmenite solution heated to 96° C was added to a 282 ml body of water (preheated to 91° C) with constant feed rate over a period of 16 minutes, under agitation in a reactor fitted with a reflux condenser.

The ionic concentration of the body of water at the end of the first minute was 95.8 g/l.

The operations following the addition were carried out in the same manner as in Example 1 except for 217 ml of $H_2O$ being added during the course of precipitation. A hydrolysis yield of 94.8% was obtained whilst the final concentration in the acid solution was equal to 318.5 g/l of $H_2SO_4$.

The final titanium dioxide had an average diameter of 0.205 micron and a Reynolds reducing power equal to 1820, these values being clearly improved with respect to those of Example 1.

The results of Example 3 are summarised in the Table.

EXAMPLE 4 (invention)

The test in Example 3 was repeated with the same manner of operating excepting for the fact that the body of water was 290 ml so as to obtain an ionic concentration equal to 93.6 g/liter in the said body after 1 minute of minute of feeding the ilmenite solution.

The following operations were also conducted in the same operative manner as in Example 3 and consequently as in Example 1 except for 209 ml of water being added during the course of the precipitation.

A hydrolysis yield of 95.2% was obtained whilst the concentration in the final acid solution was 321.6 g/l of $H_2SO_4$.

The final titanium dioxide has an average diameter of 0.20 micron and a Reynolds reducing power of 1800, these values being clearly improved with respect to those of Example 1.

EXAMPLE 5 (comparative)

Precipitation of the ilmenite solution of Example 1 was carried out with the same manner of operation as in Example 1 except for the fact that the body of water was 327 ml so as to obtain in the said body, after 1 minute of feeding the ilmenite solution, an ionic concentration equal to 84.7 g/liter.

The following operations were again carried out in the same manner of operation as in Example 1 but for 172 ml of water being added in the course of the precipitation. The results obtained are shown in the Table.

As may be noted, too low an ionic concentration does not give good results with respect to the characteristics of the titanium dioxide, even if the sulphuric acid concentration in the final acid solution is within the predetermined range.

EXAMPLE 6 (comparative)

Precipitation of the ilmenite solution of Example 1 was carried out in the same manner and in Example 1, an ionic concentration of 105.6 g/l being obtained in the body of water at the end of the first minute of feeding of the ilmenite solution.

The following operations were again carried out as in Example 1 excepting for the fact that in the course of precipitation 249 ml of water were added so as to obtain a concentration of sulphuric acid in the final acid solution within the range 315–325 g/l. The results are summarised in the Table.

As may be seen, even if the sulphuric acid concentration in the final acid solution is the correct one, the properties of the titanium dioxide are not satisfactory because the ionic concentration value is not correct.

EXAMPLES 7, 8 and 9 (invention)

Three titanium dioxide precipitation tests were carried out on the ilmenite solution of Example 2 according to the process of the present invention. These tests were carried out according to the procedure described in Example 2 except for the initial body of water being regulated so as to obtain values of the ionic concentration equal to 92.5, 89.7 and 87.1 g/l respectively, after one minute of feeding of the ilmenite solution.

The following operations were also conducted in the same manner as in Example 2 except for the addition of 309, 297 and 285 ml respectively of water during the course of precipitation.

The results are summarized in the Table. These results are greatly improved over those obtained in Example 2.

EXAMPLE 10 (comparative)

The precipitation of titanium hydroxide was carried out from the ilmenite solution of Example 2 in the same manner as in Example 2 except for the fact that 406 ml of water were employed as the body of water so as to obtain at the end of one minute of feeding the ilmenite solution an ionic concentration equal to 76.1 g/l.

The following operations were conducted in the same manner as in Example 2, except for the addition of 226 ml of water during the course of precipitation. The results, summarized in the Table, are unsatisfactory compared with those of Example 6, 7 and 8 because of the over-low value of the ionic concentration.

EXAMPLE 11 (comparative)

Precipitation of titanium hydroxide was carried out on the same ilmenite solution as in Example 2 in the same manner as in Example 2 except that in the course of precipitation 382 ml of water were added.

The ionic concentration in the body of water at the end of the first minute of feeding the titaniferous solution was 114.1 g/l whilst the sulphuric acid concentration in the final acid solution was 318.5 g/l.

The results are summarized in the Table.

This Example demonstrates that the characteristics of the final product do not depend so much on the overall quantity of water used during the process, as on the manner of its addition both at the commencement and during the precipitation.

EXAMPLE 12 (comparative)

Precipitation of the titanium hydroxide was carried out on the ilmenite solution of Example 2 in the same manner as in Example 2 except for the fact that 323 ml of water were used as the body of water so as to obtain at the end of the first minute of feeding the ilmenite solution an ionic concentration equal to 92.5 g/l.

The following operations were conducted as in Example 2. The results are summarized in the Table.

Even if the ionic concentration is correct the results are not satisfactory on account of the incorrect value of the sulphuric acid concentration in the final solution.

TABLE

| Example No. | Acid type | Acid Factor | Body of water ml | Ionic concentration 1st min. g/l | Dilution H₂O ml | Final concentration H₂SO₄ g/l | Hydrolysis Yield % | TiO₂ Average diameter microns | Reynolds power |
| --- | --- | --- | --- | --- | --- | --- | --- | --- | --- |
| 1 | comparison | 0.68 | 250 | 105.6 | 100 | 349.1 | 92 | 0.26 | 1620 |
| 2 | comparison | 0.81 | 250 | 114.1 | 100 | 361.9 | 83 | 0.27 | 1550 |
| 3 | invention | 0.68 | 282 | 95.8 | 217 | 318.5 | 94.8 | 0.205 | 1820 |
| 4 | invention | 0.68 | 290 | 93.6 | 209 | 321.6 | 95.2 | 0.20 | 1800 |
| 5 | comparison | 0.68 | 327 | 84.7 | 172 | 319.3 | 95 | 0.26 | 1600 |
| 6 | comparison | 0.68 | 250 | 105.6 | 249 | 318.7 | 95 | 0.24 | 1650 |
| 7 | invention | 0.81 | 323 | 92.5 | 309 | 320.6 | 95.2 | 0.21 | 1780 |
| 8 | invention | 0.81 | 335 | 89.7 | 297 | 321.2 | 94.7 | 0.21 | 1780 |
| 9 | invention | 0.81 | 347 | 87.1 | 285 | 318.7 | 94.9 | 0.20 | 1800 |
| 10 | comparison | 0.81 | 406 | 76.1 | 226 | 321.0 | 94.6 | 0.27 | 1580 |
| 11 | comparison | 0.81 | 250 | 114.1 | 382 | 318.5 | 95 | 0.32 | 1250 |
| 12 | comparison | 0.81 | 323 | 92.5 | 100 | 347.9 | 86 | 0.23 | 1720 |

We claim:

1. In a process for the hydrolysis of a titanyl sulphate solution by heating, in which the hydrolysis is initiated by gradually adding the solution at a substantially uniform rate to an aqueous liquor, the improvement which comprises adding to said aqueous liquor a titanyl sulphate solution having an acid factor of from 0.5 to 0.85, a titre, expressed as TiO$_2$, of from 230 to 260 g/l, a concentration of free sulphuric acid of from 200 to 250 g/l and a concentration of active sulphuric acid of from 500 to 600 g/l over a period of from 10 to 20 minutes, the weight ratio between aqueous liquor and titanyl sulphate solution being regulated in dependence on the acid factor of the solution in such a way as to ensure in the resulting aqueous mixture after one minute of feeding of the solution an ionic concentration of from 75 to 105 g/l and a concentration of sulfuric acid in the final hydrolysis solution of from 310 to 330 g/l, said ionic concentration after one minute of feeding being set at a value of from 92 to 102 g/l in the case of a solution with an acid factor of from 0.5 to 0.65, at a value of from 90 to 100 g/l in the case of a solution with an acid factor of from 0.65 to 0.75 and at a value of from 82 to 97 g/l in the case of a solution with an acid factor of from 0.75 to 0.85, and adding water to the hydrolysis solution resulting from the addition of the titanyl sulphate solution to the aqueous liquor, from the commencement of clouding of said hydrolysis solution up to the end of hydrolysis, to regulate the concentration of sulphuric acid in the final hydrolysis solution at a value of from 310 to 330 g/l.

2. The process of claim 1, wherein said ionic concentration after one minute of feeding is set at a value of from 95 to 98 g/l when the acid factor is from 0.5 to 0.65, at a value of from 93 to 96 g/l when the acid factor is from 0.65 to 0.75 and at a value of from 85 to 95 g/l when the acid factor is from 0.75 to 0.85.

3. The process of claim 1, wherein the titanyl sulphate solution is added over a period of time of from 15 to 20 minutes.

4. The process of claim 1, in which the said hydrolysis solution is heated to the boiling point and maintained at boiling until a permanent clouding appears in the solution, the boiling being then interrupted for a period of from 30 minutes to 1 hour and resumed until the hydrolysis is complete.

5. The process of claim 4, in which the said water is added to the hydrolysis solution once boiling has been resumed.

6. The process of claim 1, in which the said water is added in such an amount as to regulate the concentration of sulphuric acid in the final hydrolysis solution at a value of from 315 to 325 g/l.

* * * * *